DE KALB TURBEVILLE.
KITCHEN CABINET.
APPLICATION FILED JULY 22, 1921.
1,424,531.
Patented Aug. 1, 1922.
2 SHEETS—SHEET 1.
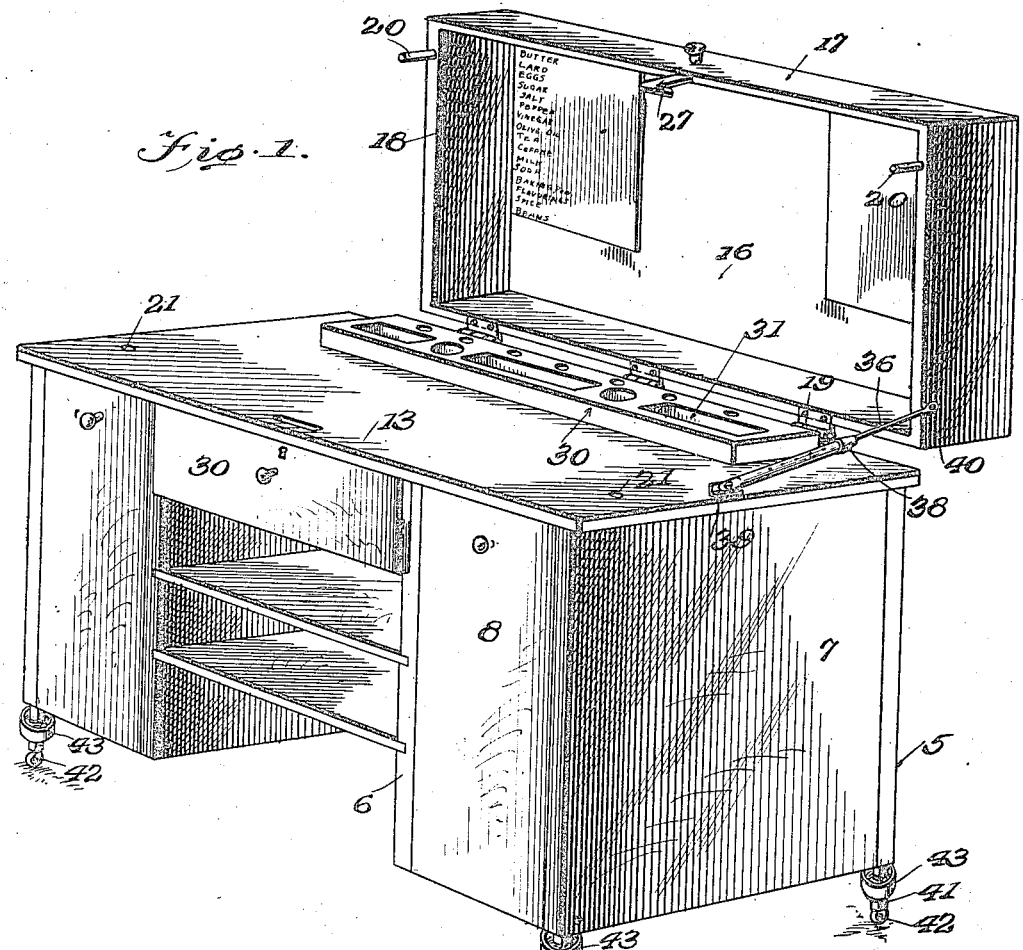
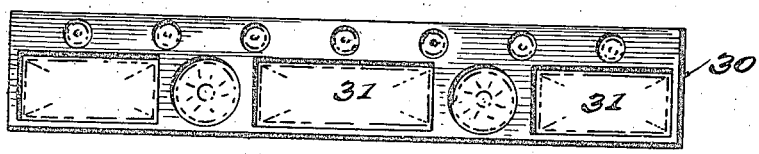
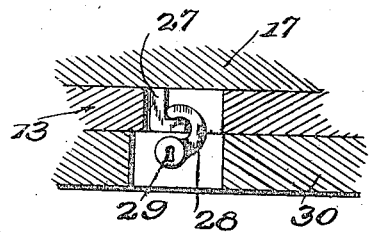
WITNESSES
INVENTOR
De K. Turbeville
BY
ATTORNEYS

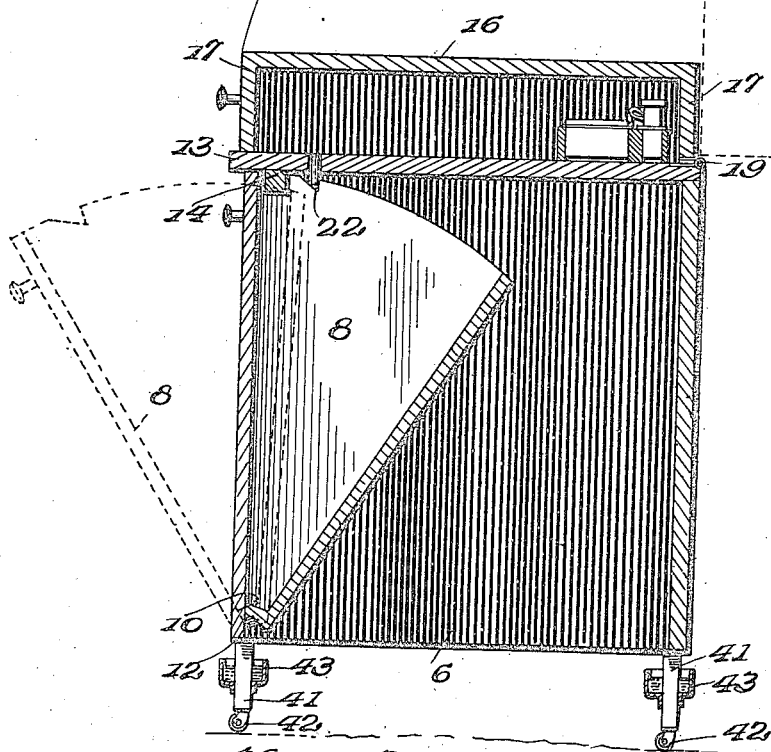
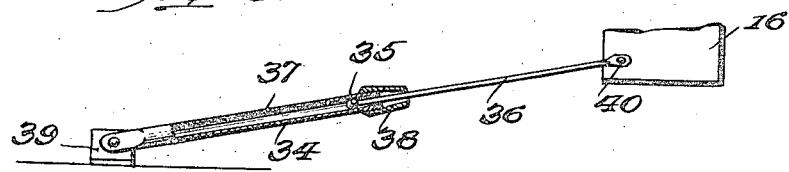

UNITED STATES PATENT OFFICE.

DE KALB TURBEVILLE, OF ROANOKE, ALABAMA.

KITCHEN CABINET.

1,424,531.  Specification of Letters Patent.  Patented Aug. 1, 1922.

Application filed July 22, 1921. Serial No. 486,785.

*To all whom it may concern:*

Be it known that I, DE KALB TURBEVILLE, a citizen of the United States, and resident of Roanoke, in the county of Randolph and State of Alabama, have invented certain new and useful Improvements in Kitchen Cabinets, of which the following is a specification.

This invention relates to kitchen cabinets especially adapted for receiving and supporting a variety of articles.

An important object is to provide a kitchen cabinet having a compartment for the reception of flour, meal and the like, which compartments are automatically locked when the cabinet is lowered.

A further object is to provide a kitchen cabinet which is dust proof, and desirable in use.

Other objects and advantages of the invention will be apparent during the course of the following description.

In the accompanying drawing forming this part of the application and wherein like numerals designate like parts throughout the same, Figure 1 is a perspective of the improved cabinet.

Figure 2 is a vertical sectional view through the cabinet.

Figure 3 is a longitudinal section through a telescoping member employed to limit the opening of the lid.

Figure 4 is a plan view of an article supporting rod embodied in the invention.

Figure 5 is a detail sectional view illustrating a lock embodied in the invention.

In the drawing the numeral 5 generally designates the improved cabinet which consists of spaced upright inner and outer walls 6 and 7 respectively between which a pair of bins 8 are arranged. The side walls 6 and 7 form a pair of compartments within which the bins are located and by reference to Figure 2 it will be observed that each bin is gradually reduced toward its lower end and is provided with a bottom wall 10 curved transversely for engagement by a transversely extending rod or pin 12. The transversely extending rods of which there are two are joined with the side walls 6 and 7 and detachably support the bins 8. The top 13 of the cabinet is provided with depending stop elements 14 arranged in the path of travel of the front and rear walls of the bin whereby to limit the swinging movement of the bins. However, when it is desired to entirely remove one of the bins 8 it is merely necessary to swing the same to its outer position as illustrated in dotted lines in Figure 2 and subsequently elevate the bin so that the same is removed from engagement with the rod 12. The front wall of each bin extends down below and conceals the rod 12.

As illustrated in Figure 1 a lid or cover 16 is hinged as indicated at 19 to the rear edge and top 13 and is provided with side and end walls 17 and 18 respectively. The top of the lid may be provided on its inner side with alphabetical lists of various foods and ingredients thereof and also with various recipes. It is thus seen that the inside of the cover forms a convenient means for supporting recipes and the like in view of the person using the cabinet. When the person is using the cabinet the cover is elevated so that the recipes applied to the inner side of the cover may be readily and conveniently seen.

The recipes are so located that they are at all times handy and cannot become lost.

The end walls 18 of the cover or lid 16 are provided adjacent their forward ends with depending pins 20 adapted to pass through openings 21 in the cover 13 and engage the walls of U-shaped notches 22 in the upper edges of the side walls of the bins 8. When the pins 20 are engaged with the side walls of the bins in the manner illustrated in Figure 2 the bins are prevented from being moved outwardly to the position illustrated in dotted lines in Figure 2.

The cover 6 is provided with a depending catch 27 adapted to be engaged by the locking member 29 of a lock designated by the numeral 29. With reference to Figure 5, it will be observed that the operation of the locking member 28 will engage the catch 27 for locking the cover in the position illustrated in full lines in Figure 2. The lock 29 is carried by a center drawer 30.

It is thus seen that when the center drawer is locked, the cover 16 will also be locked should the same be lowered and the pins 8 are also prevented from being opened.

The top 13 is provided with an article supporting rack 30 having a plurality of openings 31 of various sizes and shapes to receive receptacles and food supporting jars and containers. It is obvious that such containers as sugar containers, lard and salt containers may be inserted in the openings 31. When the cover 16 is lowered articles supported by the rack 30 are prevented from becoming covered with dust and are also prevented from being removed.

The opening of the cover 16 is limited by means of a telescoping member having a tube 34 which slidably receives the head 35 of a rod 36, the tube 34 being provided with apertures 37 to permit of the escape and inlet of air when the head 35 is reciprocated. As illustrated in Figure 3 the rear end of the tubular member 34 is provided with a sleeve 38 gradually reduced toward its lower end to limit the rearward movement of the head 35. The lower end of the tube 34 is connected to the top 13 by means of a bracket 39 while the rear end of the rod 36 is connected to the cover 16 as indicated at 40.

In the manufacture of the improved cabinet the same may be provided with legs 41 supported by rollers 42 and the legs may be provided with liquid containing receptacles 43 which when filled with liquid will prevent ants, etc., from gaining access to the food carried within the cabinet.

With reference to the foregoing description taken in connection with the accompanying drawing, it will be apparent that a cabinet constructed in accordance with this invention will greatly expedite the preparation of various dishes as practically all of the ingredients of the dishes will be within convenient reach. The top 13 may be used as a flour board or for the purpose of supporting crocks and pans when preparing food.

Having thus described the invention what is claimed is:—

1. A kitchen cabinet comprising side walls and an article supporting top defining a compartment, a bin hinged within said compartment, and an article concealing cover mounted for swinging movement on said top and having a pin adapted to engage said bin whereby to hold the bin against outward movement when the cover is down.

2. A kitchen cabinet comprising side walls and an article supporting top defining a compartment, a bin hinged within said compartment, and an article concealing cover mounted for swinging movement on said top and having a pin adapted to engage said bin whereby to hold the bin against outward movement when the cover is down, said bin being provided in its upper end portion with a notch adapted for the reception of said pin.

3. A kitchen cabinet comprising side walls defining compartments, a top secured to said side walls, bins detachably arranged in said compartments, transversely extending rods connected to said side walls and pivotally and detachably supporting said bins, stop elements carried by said top and limiting the pivotal movement of said bins, and a cover having depending pins slidable through said top and adapted to engage said bins to lock the same in closed position.

4. A kitchen cabinet comprising side walls defining compartments, a top secured to said side walls, bins in said compartments, a cover having depending pins slidable through said top and adapted to engage said bins to lock the same in closed position, and article supporting means carried by said top.

5. A kitchen cabinet comprising side walls defining compartments, a top secured to said side walls, bins detachably arranged in said compartments, rods connected to said side walls and pivotally supporting said bins, stop elements carried by said top and limiting the pivotal movement of said bins, a cover having depending pins slidable through said top and adapted to engage said bins to lock the same in closed position, and a drawer carried by said side walls and having means for locking said cover in closed position whereby the bins are also locked in closed position.

6. A kitchen cabinet comprising side walls defining compartments, a top secured to said side walls, bins in said compartments, an article concealing cover mounted on said top and having depending pins slidable through said top and adapted to engage said bins to lock the same in closed position, a drawer carried by said side walls and having means for locking said cover in closed position whereby the bins are also locked in closed position, and means to limit the opening of said cover.

7. A bin comprising upstanding side walls defining a pair of compartments, transversely extending rods extending through said compartments, bins arranged in said compartment and having bottom walls provided with transversely extending recesses receiving said rods, a top connecting said side walls and having depending stop elements extending into said bin and engaging the walls of the same to limit the movement of the bin, the side walls of said bins being provided with notches and a cover having pins adapted to engage said notches to lock the bins in closed position.

DE KALB TURBEVILLE.